US012691847B2

(12) United States Patent　　　(10) Patent No.:　US 12,691,847 B2

Ishibashi et al.　　　　　　　　　(45) Date of Patent:　　　Jul. 28, 2026

---

(54) SEATBELT RETRACTOR ATTACHMENT STRUCTURE AND MANUFACTURING METHOD OF RETRACTOR BRACKET

(71) Applicants:AUTOLIV DEVELOPMENT AB, Vargarda (SE); SUBARU CORPORATION, Tokyo (JP)

(72) Inventors: Yuto Ishibashi, Yokohama (JP); Hiroyuki Saitou, Yokohama (JP); Kenji Betsui, Yokohama (JP); Kaisei Ryu, Yokohama (JP); Takanori Nakazawa, Tokyo (JP); Hidekazu Furuno, Tokyo (JP); Takashi Kamibayashi, Tokyo (JP); Shigemi Haruta, Tokyo (JP)

(73) Assignees: AUTOLIV DEVELOPMENT AB, Vargarda (SE); SUBARU CORPORATION, Tokyo (JP)

( * ) Notice: Subject to any disclaimer, the term of this patent is extended or adjusted under 35 U.S.C. 154(b) by 561 days.

(21) Appl. No.: 18/115,481

(22) Filed: Feb. 28, 2023

(65) Prior Publication Data

US 2023/0278523 A1　　Sep. 7, 2023

(30) Foreign Application Priority Data

Mar. 2, 2022　(JP) ................................. 2022-031966
Jan. 25, 2023　(JP) ................................. 2023-009431

(51) Int. Cl.
B60R 22/34　　　(2006.01)
B60R 22/24　　　(2006.01)

(52) U.S. Cl.
CPC .............. B60R 22/34 (2013.01); B60R 22/24 (2013.01); B60R 2022/3402 (2013.01)

(58) Field of Classification Search
CPC ........... B60R 22/34; B60R 22/24; B60R 2/26; B60R 2022/266; B60R 2022/3402; B60R 2022/3424
See application file for complete search history.

(56) References Cited

U.S. PATENT DOCUMENTS 8,727,256 B2 *　5/2014　Tanaka ................ B60R 22/4676
　　　　　　　　　　　　　　　　　　　　242/374
9,688,242 B2 *　6/2017　Nakayama .............. B60R 22/34
　　　　　　　　　(Continued)

FOREIGN PATENT DOCUMENTS

JP　　　2018-138445　A　　　9/2018

*Primary Examiner* — Chi Q Nguyen
(74) *Attorney, Agent, or Firm* — MCGINN INTELLECTUAL PROPERTY LAW GROUP, PLLC

(57) ABSTRACT

In a seatbelt retractor attachment structure, a seatbelt retractor is fixed to a vehicle body via a retractor bracket. The retractor bracket includes a fixing portion, fastening portion, and a curved portion. The fixing portion is fixed to a retractor frame of the seatbelt retractor. The fastening portion is fastened and fixed to the vehicle body. The curved portion connects the fixing portion and the fastening portion. The curved portion includes a part bent from the fixing portion in a direction surrounding the seatbelt retractor and a part folded back toward the fastening portion. The curved portion has a substantially U shape. The fastening portion includes at least one of a pair of bent flange portions on both sides in a width direction of the fastening portion and a bead portion protruding along a longitudinal direction of the fastening portion.

18 Claims, 8 Drawing Sheets

(56)  References Cited

U.S. PATENT DOCUMENTS

| 10,053,051 | B2 * | 8/2018 | Clute | .................... B60R 22/405 |
| 2003/0201357 | A1 * | 10/2003 | Koning | .............. B60R 22/3413 |
| | | | | 242/379.1 |
| 2004/0090107 | A1 | 5/2004 | Mitropoulos | |
| 2011/0049284 | A1 * | 3/2011 | Kaneko | .............. B60R 22/4628 |
| | | | | 242/374 |
| 2011/0062267 | A1 * | 3/2011 | Nakaoka | ............ B60R 22/4628 |
| | | | | 242/374 |
| 2011/0291396 | A1 * | 12/2011 | Tanaka | ............... B60R 22/4633 |
| | | | | 280/806 |
| 2023/0278523 | A1 * | 9/2023 | Ishibashi | ................. B60R 22/24 |
| | | | | 242/379 |

* cited by examiner

--- TARGET
— n1: BRACKET OF EMBODIMENT
— n2: BRACKET OF EMBODIMENT
--- n3: BRACKET OF EMBODIMENT
--- AVERAGE VALUE: STANDARD BRACKET

--- TARGET
— n1: BRACKET OF EMBODIMENT
— n2: BRACKET OF EMBODIMENT
--- n3: BRACKET OF EMBODIMENT
--- AVERAGE VALUE: STANDARD BRACKET

--- TARGET
— n1: BRACKET OF EMBODIMENT
— n2: BRACKET OF EMBODIMENT
--- n3: BRACKET OF EMBODIMENT
— AVERAGE VALUE: STANDARD BRACKET

SEATBELT RETRACTOR ATTACHMENT STRUCTURE AND MANUFACTURING METHOD OF RETRACTOR BRACKET

CROSS-REFERENCE TO RELATED APPLICATIONS

The present application claims priority from Japanese Patent Applications No. 2022-031966 filed on Mar. 2, 2022 and No. 2023-009431 filed on Jan. 25, 2023, the entire contents of which are hereby incorporated by reference.

BACKGROUND

The present disclosure relates to a seatbelt retractor attachment structure and a manufacturing method of a retractor bracket.

A seatbelt retractor that restrains and protects an occupant by a seatbelt at the time of collision or sudden deceleration of a vehicle is fixed to a vehicle body such as a center pillar via a retractor bracket fixed to the seatbelt retractor. In a side vehicle body structure of a vehicle described in Japanese Unexamined Patent Application Publication (JP-A) No. 2018-138445, a seatbelt retractor is disposed on a vehicle interior side of a pillar portion, an upper end portion is fixed to a pillar inner upper portion, a lower end portion is fixed to an anchor bracket supported by a pillar inner lower portion, and the anchor bracket is fixed to a partition member that partitions an internal space of the pillar portion in a vehicle body upper-lower direction, thereby improving the support strength of the seatbelt retractor. In a seatbelt device provided with an energy absorbing mechanism described in US2004/0090107, at least one bent portion is provided in a plate-shaped retractor bracket, and the bent portion is deformable at the time of vehicle collision to absorb energy of the collision.

However, in the side vehicle body structure of the vehicle described in Japanese Unexamined Patent Application Publication (JP-A) No. 2018-138445, since the upper end portion and the lower end portion of the seatbelt retractor are fixed by the pillar inner upper portion and the anchor bracket, when an impact generated at the time of side collision is directly transmitted to a fastening part, the fastening part may be detached or broken.

In the energy absorbing mechanism described in US2004/0090107, a specific attachment state of the seatbelt retractor to the vehicle body is not described, and in particular, it is difficult to apply the energy absorbing mechanism to a structure disposed in a recess formed in a center pillar. Further, when the retractor bracket includes the bent portion, the retractor bracket is likely to be deformed, and thus there is a concern that vibration characteristics may be deteriorated.

SUMMARY

According to an aspect of the disclosure, in a seatbelt retractor attachment structure, a seatbelt retractor is fixed to a vehicle body via a retractor bracket. The retractor bracket includes a fixing portion, fastening portion, and a curved portion. The fixing portion is fixed to a retractor frame of the seatbelt retractor. The fastening portion is fastened and fixed to the vehicle body. The curved portion includes a part bent from the fixing portion in a direction surrounding the seatbelt retractor and extending to a top part of the curved portion and a part folded back from the top part and extending toward the fastening portion. The curved portion has a substantially U shape. The fastening portion includes at least one of a pair of bent flange portions on both sides in a width direction of the fastening portion and a bead portion protruding along a longitudinal direction of the fastening portion.

According to an aspect of the disclosure, a retractor bracket includes a fixing portion, a fastening portion which is apart from the fixing portion in a first direction and having a fastening plate portion and a stiffening portion, and a curved portion connecting the fixing portion and the fastening portion and having a first part, a top part and a second part. A manufacturing method of the retractor bracket includes bending a plate member at a boundary portion between the fixing portion and the curved portion so that the first part of the curved portion extends toward one side of a second direction intersecting the first direction with respect to the fixing portion, bending the plate member at a boundary portion between the fastening portion and the curved portion so that the second part of the curved portion extends toward the one side of the second direction with respect to the fastening portion, bending the plate member so that the second part of the curved portion extends toward the other side of the second direction to form the top part of the curved portion, and forming the stiffening portion in the fastening portion so that the stiffening portion protrudes toward the second direction.

BRIEF DESCRIPTION OF DRAWINGS

The accompanying drawings are included to provide a further understanding of the disclosure and are incorporated in and constitute a part of this specification. The drawings illustrate embodiments and, together with the specification, serve to describe the principles of the disclosure.

DESCRIPTION OF EMBODIMENTS

Hereinafter, a seatbelt retractor attachment structure according to an embodiment will be described in detail with reference to the drawings.

Figure 1:
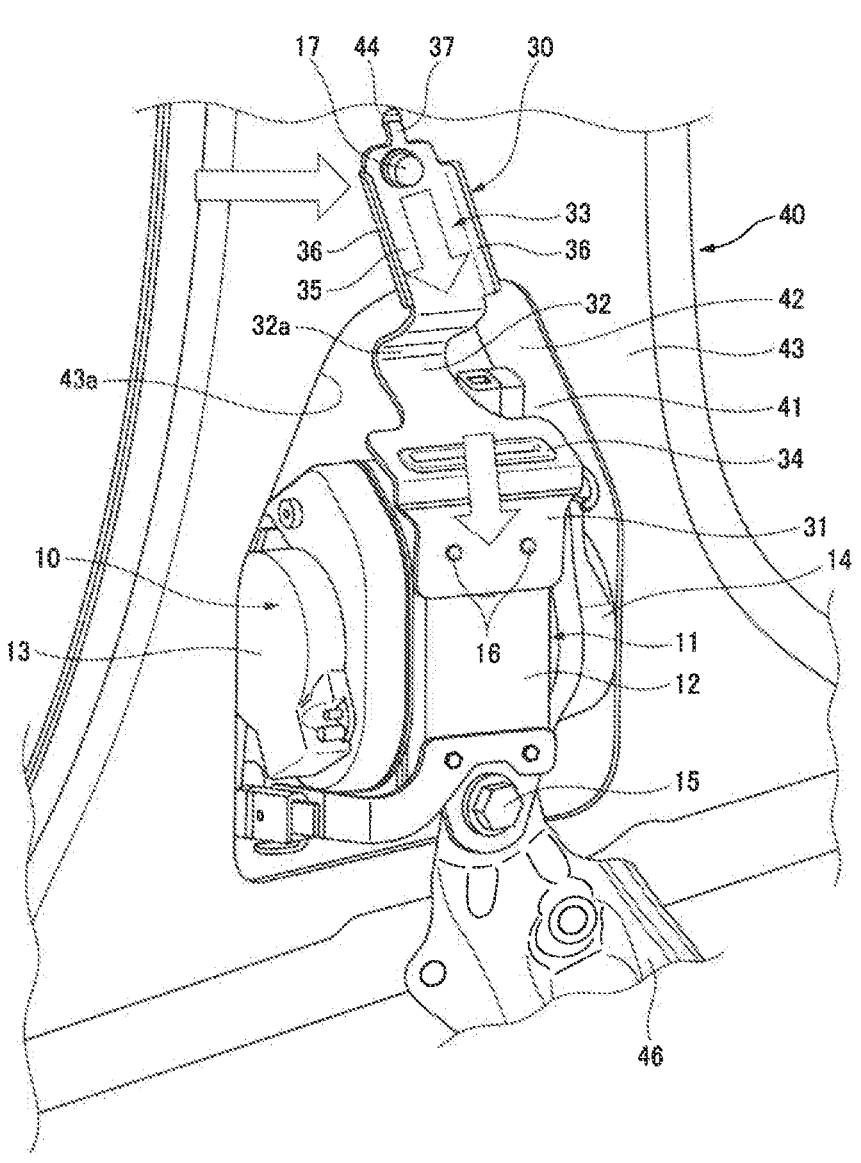
FIG. 1 is a perspective view showing a state in which a seatbelt retractor according to an embodiment is attached to a center pillar via a retractor bracket, as viewed from a vehicle interior side with a pillar trim removed.

As shown in FIG. 1, in the seatbelt retractor attachment structure of the present embodiment, a seatbelt retractor 10 is fixed, via a retractor bracket 30, to a center pillar (B pillar) 40 constituting a part of a vehicle body. The seatbelt retractor 10 and a part of the retractor bracket 30 are housed in a recess 41 formed in the center pillar 40.

The center pillar 40 includes an outer pillar (not shown) having a substantially trapezoidal cross section and constituting a surface on a vehicle outer side, an inner pillar 43 disposed on a vehicle inner side of the outer pillar, a reinforcement 42 provided between the outer pillar and the inner pillar 43, and a pillar trim 45 (see FIG. 6) made of resin or the like and disposed further on the vehicle inner side of the inner pillar 43.

The recess 41 is formed by recessing the reinforcement 42, which is located on a vehicle exterior side of an opening 43a of the inner pillar 43, toward a vehicle exterior direction, and the seatbelt retractor 10 is surrounded by the recess 41 of the reinforcement 42 and the pillar trim 45. A seatbelt is drawn into a vehicle interior through an opening (not shown) formed in the pillar trim 45.

The seatbelt retractor 10 retracts the seatbelt such that the seatbelt can be drawn out, and locks the seatbelt to protect an occupant when a vehicle suddenly decelerates due to collision or the like. The seatbelt retractor 10 includes a retractor frame 11 that supports a spindle (not shown) around which the seatbelt is wound. The seatbelt retractor 10 is fixed to the center pillar 40 by attaching an upper end portion of a back plate portion 12 of the retractor frame 11 to an upper portion of the center pillar 40 via the retractor bracket 30, and fastening, with a bolt 15, a lower end portion of the back plate portion 12 to an anchor bracket 46 joined to a lower portion of the center pillar 40. Therefore, the lower end portion of the back plate portion 12 has a bolt insertion hole (not shown) through which the bolt 15 is inserted. Further, the seatbelt retractor 10 is provided with a sensor cover 13 for accommodating a sensor for detecting acceleration acting on the vehicle body, a side cover 14 for covering a winding spring for winding back the seatbelt, and the like on lateral sides of the retractor frame 11.

Figure 2:
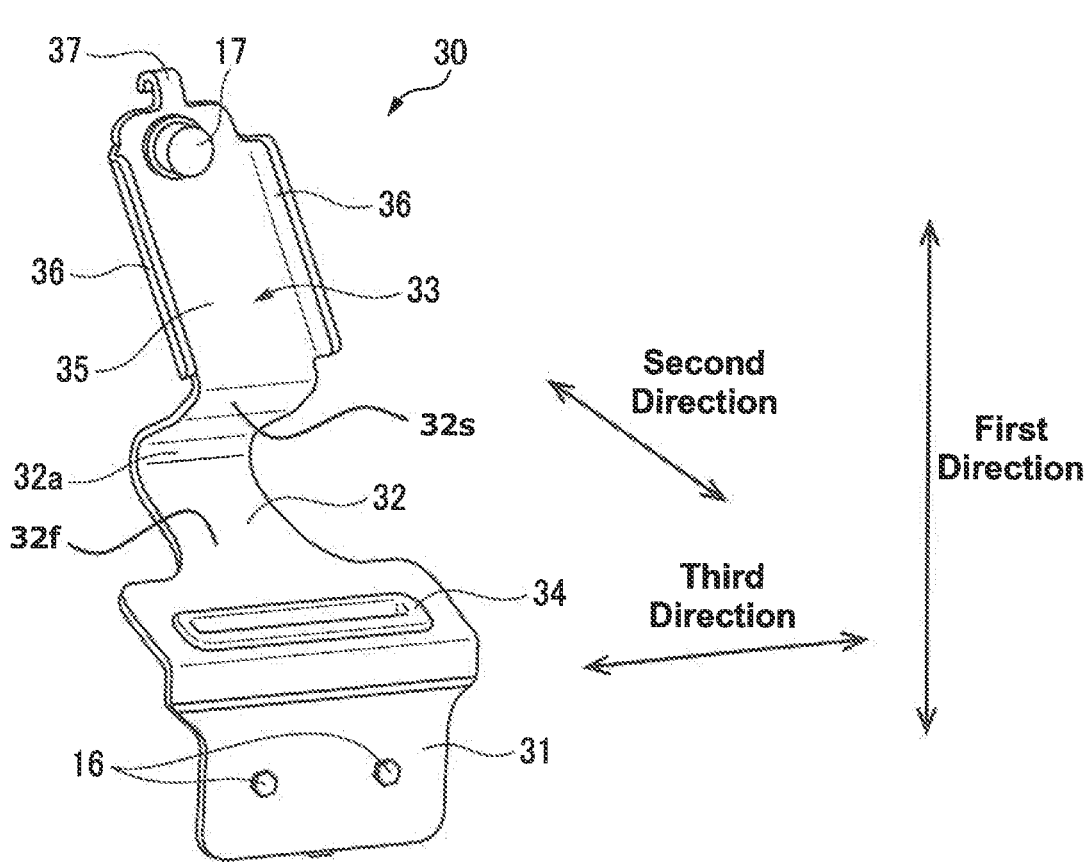
FIG. 2 is a perspective view of the retractor bracket shown together with a fastening bolt and crimping pins.
Figure 3B:
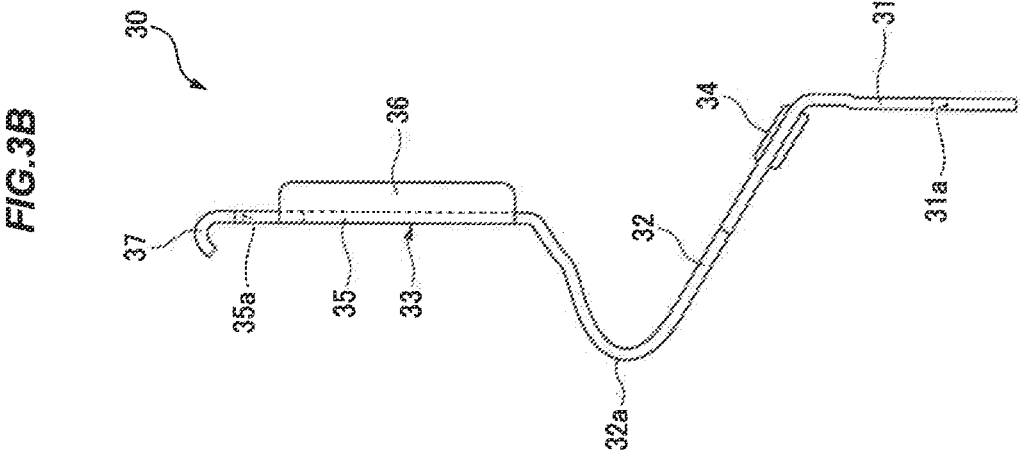
FIG. 3B is a side view of the retractor bracket.
Figure 3A:
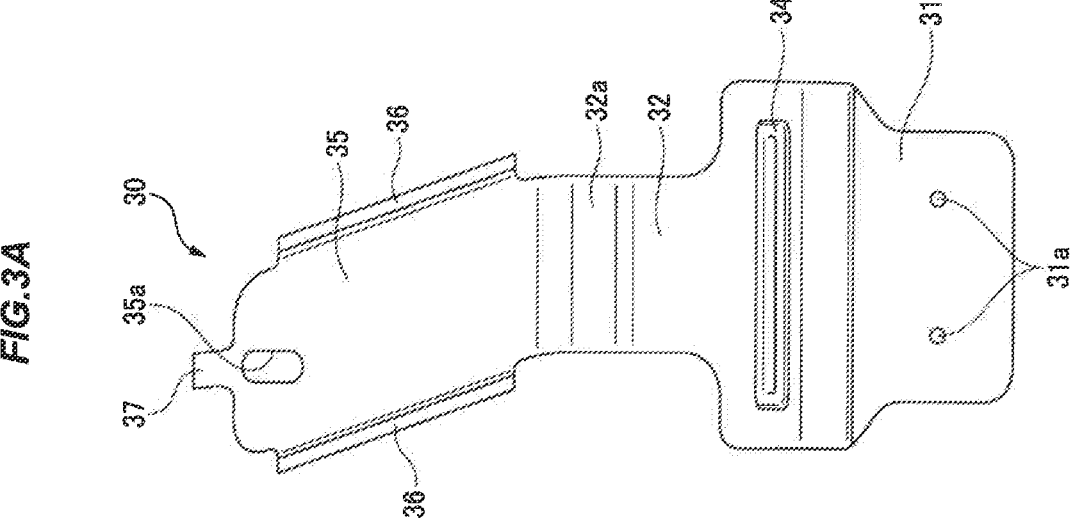
FIG. 3A is a front view of the retractor bracket.

Referring also to FIG. 2 and FIGS. 3A and 3B, the retractor bracket 30 is formed by bending a plate member made of a steel plate, and includes a fixing portion 31 fixed to the upper end portion of the back plate portion 12 of the retractor frame 11, a fastening portion 33 fastened and fixed to the center pillar 40, and a curved portion 32 connecting the fixing portion 31 and the fastening portion 33.

The fixing portion 31 is formed in a substantially rectangular plate shape, is overlapped with the upper end portion of the back plate portion 12 of the retractor frame 11, and is crimped and fixed to the retractor frame 11 by a plurality of (two in the present embodiment) crimping pins 16 inserted through insertion holes 31a of the fixing portion 31.

The curved portion 32 is bent from an upper end of the fixing portion 31 in a direction surrounding the seatbelt retractor 10, that is, outward in the vehicle width direction, and then further bent inward in the vehicle width direction to form a substantially U shape. In the curved portion 32, a belt insertion hole for inserting the seatbelt is formed in a portion from the upper end of the fixing portion 31 to a top part 32a of the curved portion 32, and a seatbelt guide member 34 made of, for example, a resin is attached to the belt insertion hole for preventing damage to the seatbelt when the seatbelt is drawn out and for reducing draw-out resistance. The curved portion 32 acts as an energy absorbing mechanism that absorbs, at the time of side collision, energy of the collision by deforming the curved portion 32.

The fastening portion 33 is formed continuously from the curved portion 32, includes a plate-shaped fastening plate portion 35 provided with a bolt insertion hole 35a through which a fastening bolt 17 is inserted, and a pair of flange portions 36 bent at substantially 90° on both sides in a width direction of the fastening plate portion 35, and the fastening portion 33 is formed to have a substantially U-shaped cross section.

The fastening portion 33 is fastened to the inner pillar 43 by screwing the fastening bolt 17 inserted into the bolt insertion hole 35a of the fastening plate portion 35 with a nut (not shown) joined to a portion of the inner pillar 43 above the recess 41. In the present embodiment, the fastening plate portion 35 extends obliquely with respect to an extending direction of the curved portion 32 from a boundary portion with the curved portion 32 according to a position of the nut, that is, a position of an attachment portion to the center pillar 40.

Further, since the pair of flange portions 36 are formed on the fastening portion 33 on both sides in the width direction of the fastening plate portion 35 over a length direction thereof, the rigidity of the fastening portion 33 is increased, and the vibration characteristics during traveling at the retractor bracket 30 including the curved portion 32 can be satisfied. In the present embodiment, a length of the flange portion 36 is ⅔ or more of a length of the fastening plate portion 35.

The pair of flange portions 36 are both bent in a direction opposite to a bending direction of the curved portion 32, that is, a direction in which a top part 32a of the curved portion 32 protrudes (inward in the vehicle width direction). Accordingly, when the fastening portion 33 of the retractor bracket 30 is attached to the center pillar 40, interference between the pair of flange portions 36 and the center pillar 40 is prevented.

A hook portion 37 that is bent outward in the vehicle width direction is provided at an upper end portion of the fastening portion 33, and the hook portion 37 is engaged with a hook engagement hole 44 (see FIG. 1) of the inner pillar 43 formed above the recess 41.

Therefore, for the seatbelt retractor 10 in which the retractor bracket 30 is crimped and fixed to the retractor frame 11 by the plurality of crimping pins 16, the hook portion 37 of the retractor bracket 30 is engaged with the hook engagement hole 44, and the seatbelt retractor 10 is accommodated in the recess 41 to roughly position the seatbelt retractor 10. Thereafter, the lower end portion of the retractor frame 11 of the seatbelt retractor 10 is fixed, by the bolt 15, to the anchor bracket 46 fixed to the inner pillar 43, and the fastening portion 33 is fixed to the inner pillar 43 by the bolt 17. Thus, the seatbelt retractor 10 is fixed to the center pillar 40 at two upper and lower positions.

As described above, since the seatbelt retractor 10 is fixed to the center pillar 40 via the retractor bracket 30, when the center pillar 40 is deformed to the vehicle interior side due to side collision, an impact force is transmitted to the seatbelt retractor 10 via the retractor bracket 30 and is also transmitted to the crimping pins 16 connecting the retractor bracket 30 and the seatbelt retractor 10, as indicated by arrows in FIG. 1.

However, the impact energy transmitted to the crimping pins 16 is absorbed due to deformation of the curved portion 32 of the retractor bracket 30, and a force acting on the crimping pins 16 connecting the retractor bracket 30 and the seatbelt retractor 10 is significantly reduced. As a result, breakage of the crimping pins 16 is prevented, and an amount of intrusion of the seatbelt retractor 10 or the like into the vehicle interior can be reduced.

Further, since the pair of flange portions 36 are formed on the fastening portion 33 at both end portions in the width direction of the fastening plate portion 35, the rigidity of the fastening portion 33 is increased, and the vibration characteristics during traveling at the retractor bracket 30 including the curved portion 32 can be satisfied.

Here, a noise test was performed for a case of using the retractor bracket 30 of the present embodiment including the curved portion and the flange portions, and a case of using a standard retractor bracket in the related art that does not include the curved portion and the flange portions.

Figure 4:
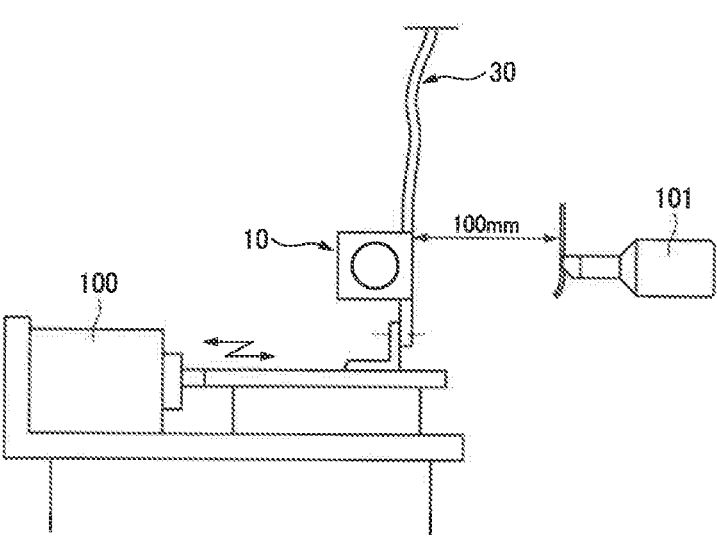
FIG. 4 is a diagram showing a test apparatus for performing an abnormal noise test in a case where the retractor bracket of the embodiment is used and in a case where a standard retractor bracket is used.

In a test method, as shown in FIG. 4, the seatbelt retractor 10 was disposed in the same manner as in an actual vehicle, and was swept with a vibration frequency of 10 Hz to 60 Hz and an acceleration of 0.7 G for 60 seconds in three axial directions (X, Y, and Z directions) on a reference axis of the seatbelt retractor 10 by a vibrator 100, and noise at that time was measured by a noise meter 101 installed at a distance of 100 mm from the seatbelt retractor. The retractor bracket according to the present embodiment was tested three times in each of the X, Y, and Z directions.

Figure 5A:
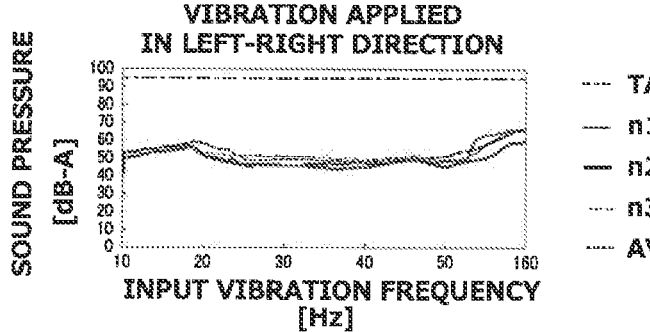
FIGS. 5A to 5C are graphs showing abnormal noise test results in the case where the retractor bracket of the embodiment is used and in the case where the standard retractor bracket is used.
Figure 5B:
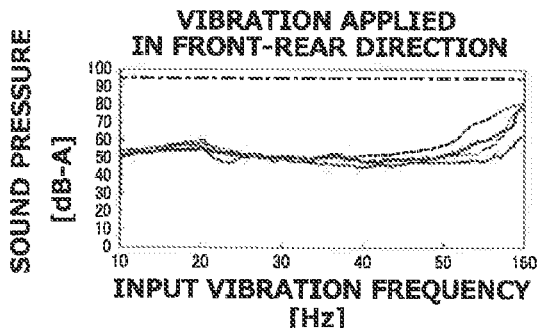
Figure 5C:
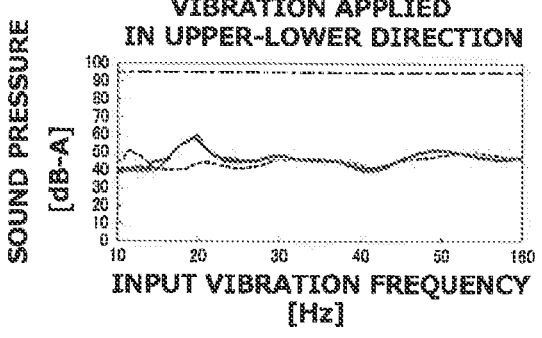

FIGS. 5A to 5C each show test results of three time of the retractor bracket 30 according to the present embodiment, a test result (average value of a plurality of test results) of the standard retractor bracket in the related art, and a determination reference value (95 dB).

As shown in FIGS. 5A to 5C, the test results of three times of the retractor bracket according to the present embodiment were equal to or less than the determination reference value (95 dB) in all vibrations in the X, Y, and Z directions, were equal to or less than the test results of the retractor bracket in the related art, and were at a level with no problem. Further, abnormal noise such as squeaking noise and rattling noise was not found over an entire period of the test, and good results were obtained.

The present invention is not limited to the embodiment described above, and modifications, improvements, and the like can be made as appropriate.

Figure 6:
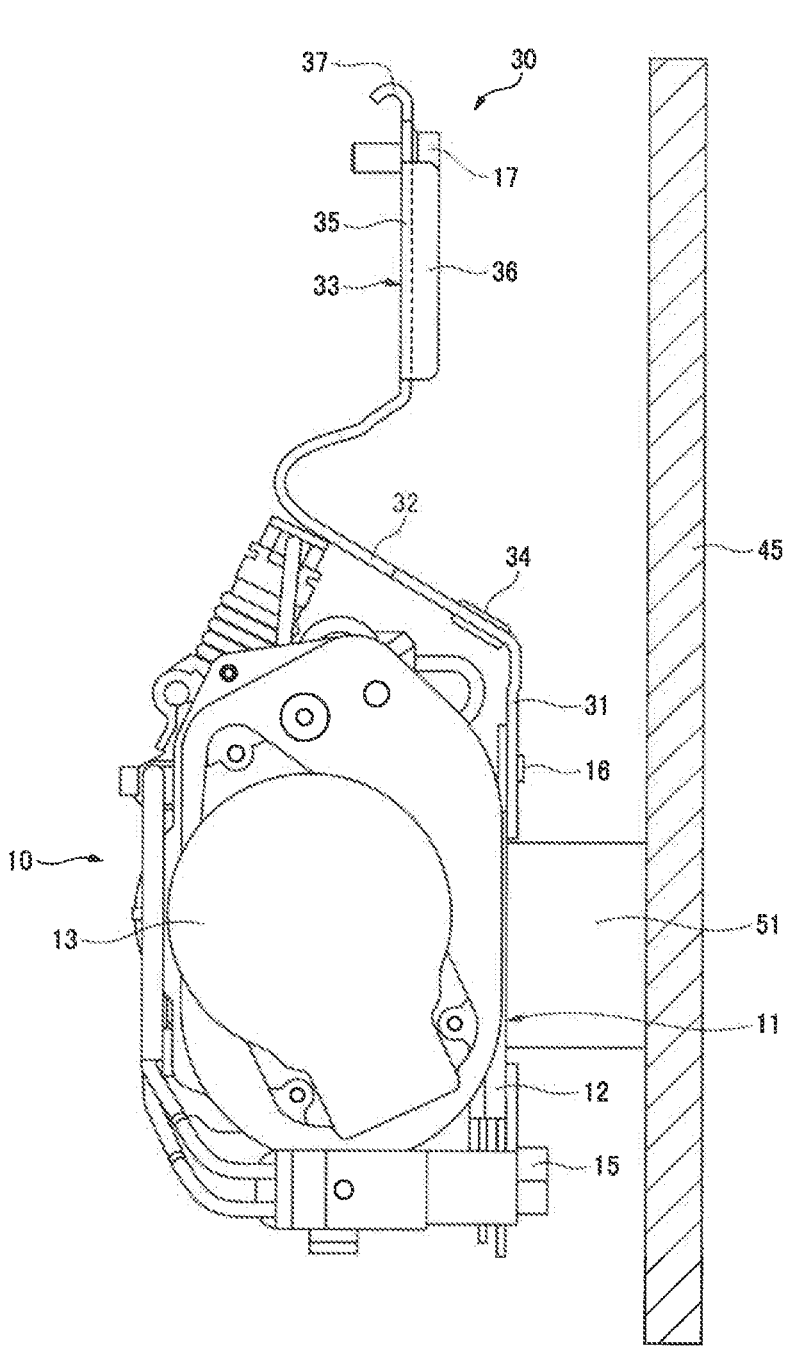
FIG. 6 is a side view showing a state in which a damping member is disposed between the seatbelt retractor and the pillar trim.

For example, as in a modification shown in FIG. 6, a damping member 51 capable of absorbing a vibration of the seatbelt retractor 10 may be provided between the seatbelt retractor 10 and the pillar trim 45. Accordingly, since the vibration acting on the seatbelt retractor 10 is absorbed by the damping member 51, the vibration characteristics during traveling at the fastening portion between the seatbelt retractor 10 and the retractor bracket 30 can be further improved.

Figure 7:
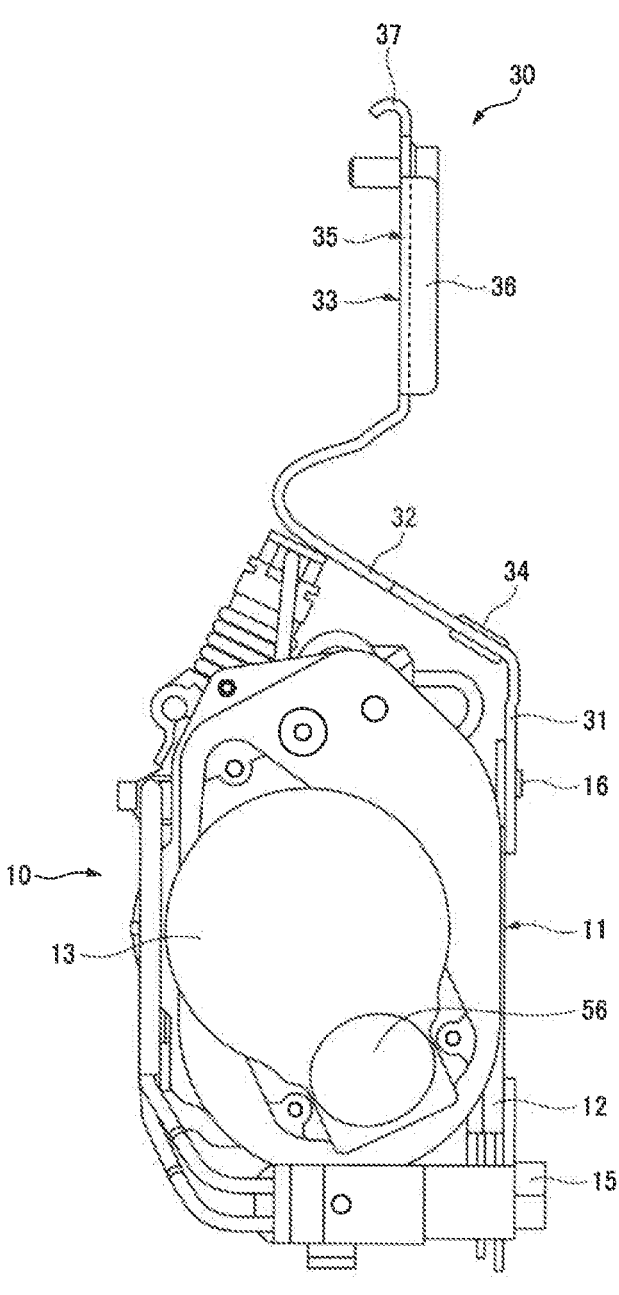
FIG. 7 is a side view of the seatbelt retractor in which a sound absorbing member is attached to a sensor cover.

As in another modification shown in FIG. 7, a sound absorbing member 56 may be attached to the sensor cover 13 of the seatbelt retractor 10 to absorb operation noise of the seatbelt retractor 10. As the sound absorbing member 56, a sheet made of butyl rubber or the like is suitable.

Figure 8:
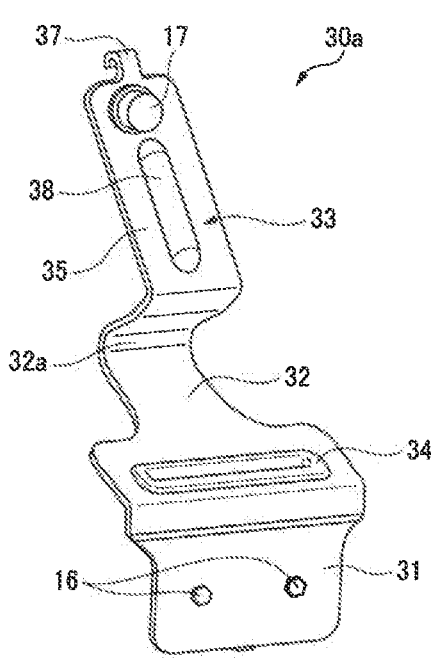
FIG. 8 is a perspective view of a retractor bracket according to a modification.

Further, as in another modification shown in FIG. 8, the fastening portion 33 of a retractor bracket 30a may include a bead portion 38 protruding along the longitudinal direction at an intermediate portion in the width direction, instead of the pair of flange portions. Therefore, the rigidity of the fastening portion 33 may be increased by the bead portion 38, and the vibration characteristics during traveling at the retractor bracket 30 including the curved portion 32 may be satisfied.

The retractor bracket of the present invention may be configured such that the fastening portion 33 includes both the pair of flange portions 36 and the bead portions 38, and the fastening portion 33 has higher rigidity.

Further, in the above description, the seatbelt retractor is attached to the center pillar (B pillar), but the seat belt retractor is not limited to being attached to the center pillar, and may be attached to another pillar or a vehicle body frame.

According to the embodiments and the modifications, as shown in FIG. 2, the retractor bracket 30 includes the fixing portion 31, the fastening portion 33, and the curved portion 32. The fastening portion 33 is apart from the fixing portion 31 in a first direction. The fastening portion 33 includes a fastening plate portion 35 and the stiffening portion 36, 38. The curved portion 32 connects the fixing portion 31 and the fastening portion 33. The curved portion 32 has a first part 32f, the top part 32a and a second part 32s. The stiffening portion may include the pair of flange portions 36. The stiffening portion may include the bead portion 38.

The first part 32f of the curved portion 32 extends toward one side of a second direction intersecting the first direction with respect to the fixing portion 31. The second part 32s of the curved portion 32 extends toward the one side of the second direction with respect to the fastening portion 33. The second part 32s of the curved portion 32 extends toward the other side of the second direction to form the top part 32a of the curved portion 32.

The retractor bracket 30 is manufactured by: bending the plate member at a boundary portion between the fixing portion 31 and the curved portion 32 so that the first part 32f of the curved portion 32 extends toward one side of the second direction with respect to the fixing portion 31; bending the plate member at a boundary portion between the fastening portion 33 and the curved portion 32 so that the second part 32s of the curved portion 32 extends toward the one side of the second direction with respect to the fastening portion 33; bending the plate member so that the second part 32s of the curved portion 32 extends toward the other side of the second direction to form the top part 32a of the curved portion 32; and forming the stiffening portion 36, 38 in the fastening portion 33 so that the stiffening portion 36, 38 protrudes toward the second direction.

According to the seatbelt retractor attachment structure and the manufacturing method of the retractor bracket of the embodiments and modifications, since the retractor bracket 30 includes the curved portion 32, with a sample structure, a fastening structure between the seatbelt retractor 10 and the retractor bracket 30 can be prevented from being damaged during side collision of the vehicle, and an amount of intrusion into the vehicle interior can be reduced. Further, since the fastening portion 33 includes at least one of the pair of flange portions 36 on both sides in the width direction and the bead portion 38 along the longitudinal direction, the vibration characteristics can be satisfied even the retractor bracket includes the curved portion 32.

What is claimed is:

1. A seatbelt retractor attachment structure for fixing a seatbelt retractor to a vehicle body via a retractor bracket, the seat belt retractor attachment structure comprising:

the retractor bracket, wherein the retractor bracket includes:

a fixing portion to be fixed to a retractor frame of the seatbelt retractor;

a fastening portion to be fastened and fixed to the vehicle body; and a curved portion connecting the fixing portion and the fastening portion, wherein the curved portion includes a part bent from the fixing portion in a direction surrounding the seatbelt retractor and extending to a top part of the curved portion and a part folded back from the top part and extending toward the fastening portion, and the curved portion has a U shape, and wherein the fastening portion includes at least one of a pair of bent flange portions on both sides in a width direction of the fastening portion and a bead portion protruding along a longitudinal direction of the fastening portion.

2. The seatbelt retractor attachment structure according to claim 1, wherein the fixing portion of the retractor bracket is fixed to a back plate portion of the retractor frame by a crimping pin.

3. The seatbelt retractor attachment structure according to claim 1, wherein the flange portions are both bent in a direction opposite to a bending direction of the curved portion.

4. The seatbelt retractor attachment structure according to claim 1, wherein a belt insertion hole is formed in the curved portion, and wherein the seatbelt is to be inserted through the belt insertion hole.

5. The seatbelt retractor attachment structure according to claim 1, wherein the seatbelt retractor and the curved portion of the retractor bracket are disposed in a recess formed in a center pillar of the vehicle body.

6. The seatbelt retractor attachment structure according to claim 1, wherein the fastening portion includes a fastening plate portion extending obliquely with respect to an extending direction of the curved portion from a boundary portion with the curved portion.

7. The seatbelt retractor attachment structure according to claim 1, wherein a damping member capable of absorbing a vibration of the seatbelt retractor is disposed between the retractor frame and the vehicle body.

8. The seatbelt retractor attachment structure according to claim 1, wherein a sound absorbing member is disposed on a side cover of the seatbelt retractor.

9. The vehicle comprising the seatbelt retractor attachment structure according to claim 1, further comprising the vehicle body and the seatbelt retractor.

10. Seatbelt retractor attachment structure comprising:
a retractor bracket,
wherein the retractor bracket includes:
  a fixing portion configured to be fixed to a retractor frame of a seatbelt retractor;
  a fastening portion configured to be fastened and fixed to a vehicle body; and
  a curved portion connecting the fixing portion and the fastening portion,
wherein the curved portion includes a part bent from the fixing portion in a direction surrounding the seatbelt retractor and extending to a top part of the curved portion and a part folded back from the top part and extending toward the fastening portion, and the curved portion has a U shape, and wherein the fastening portion includes at least one of a pair of bent flange portions on both sides in a width direction of the fastening portion and a bead portion protruding along a longitudinal direction of the fastening portion.

11. The seatbelt retractor attachment structure according to claim 10, wherein the fixing portion of the retractor bracket is fixed to a back plate portion of the retractor frame by a crimping pin.

12. The seatbelt retractor attachment structure according to claim 10, wherein the flange portions are both bent in a direction opposite to a bending direction of the curved portion.

13. The seatbelt retractor attachment structure according to claim 10, wherein a belt insertion hole is formed in the curved portion, and wherein the seatbelt is to be inserted through the belt insertion hole.

14. The seatbelt retractor attachment structure according to claim 10, wherein the seatbelt retractor and the curved portion of the retractor bracket are disposed in a recess formed in a center pillar of the vehicle body.

15. The seatbelt retractor attachment structure according to claim 10, wherein the fastening portion includes a fastening plate portion extending obliquely with respect to an extending direction of the curved portion from a boundary portion with the curved portion.

16. The seatbelt retractor attachment structure according to claim 10, wherein a damping member capable of absorbing a vibration of the seatbelt retractor is disposed between the retractor frame and the vehicle body.

17. The seatbelt retractor attachment structure according to claim 10, wherein a sound absorbing member is disposed on a side cover of the seatbelt retractor.

18. A vehicle comprising the retractor attachment structure according to claim 10, further comprising the vehicle body, and the seatbelt retractor,
wherein the seatbelt retractor attachment structure is configured to fix a seatbelt retractor to the vehicle body via a retractor bracket.

* * * * *